United States Patent Office 2,945,503
Patented July 19, 1960

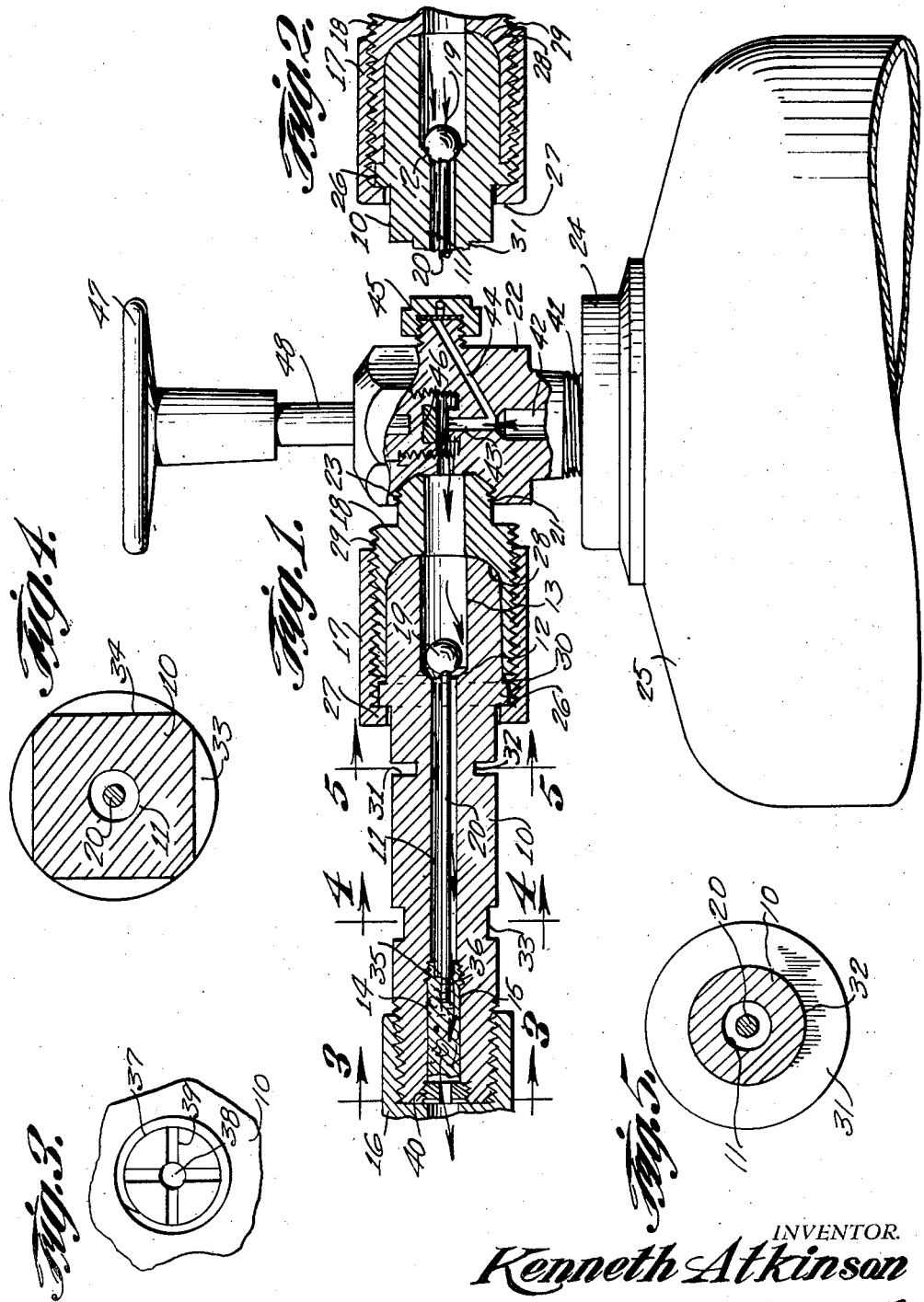

2,945,503

SAFETY CONNECTOR FOR HIGH PRESSURE GAS, STEAM, OR LIQUID CONTAINERS

Kenneth Atkinson, 30 E. Hartsdale Ave., Hartsdale, N.Y.

Filed Apr. 26, 1957, Ser. No. 655,296

2 Claims. (Cl. 137—68)

This invention relates to $CO_2$ and other high pressure gas containers such as used for supplying gas for welding, cutting, and the like, and in particular a valve positioned in a fitting or connection in the neck of the container whereby upon accidental breaking of an extended part of the fitting a valve is closed and retained in the closed position by the high pressure within the container making is impossible for the gas in the container to escape.

The purpose of this invention is to eliminate the possibility of the sudden release of both explosive and non-explosive high pressure gases such as supplied in tubular containers when fittings or valves extended from ends of the containers are accidently broken.

In numerous instances outlet connections at the ends of high pressure gas containers are accidently broken by a container falling or by the fitting being struck with a passing body and in such instances the release of the high pressure gas, such as gas at 2,200 pounds pressure and particularly gases such as oxygen, helium, carbon dioxide and hydrogen are released resulting in great damage to surrounding buildings and workmen are often killed. Upon accidental breaking of a fitting at the end of a high pressure gas container the gas is released with the container being skyrocketed through buildings and the like.

With this thought in mind this invention contemplates a ball check valve incorporated in a fitting at the end of a high pressure gas container in which the ball is retained in spaced relation to a valve seat and wherein upon accidental breaking of the fitting the ball is drawn against the valve seat preventing the escape of the gas or other fluid.

The object of this invention is, therefore, to provide a safety valve in the connection at the end of a high pressure gas container wherein the valve is closed automatically upon accidental breaking of the connection.

Another object of the invention is to provide means for incorporating a safety valve in an outlet connection of a high pressure gas container wherein the device is designed to be installed in conventional outlet fittings of such containers.

A further object of the invention is to provide a valve for closing outlet connections of high pressure gas containers upon accidental breaking of outer ends of the connections in which the device is of a simple and economical construction.

With these and other objects and advantages in view the invention embodies a cylindrical body having a bore therethrough with a valve seat in one end and a filter element in the opposite end and in which an annular recess provides a weak point whereby upon contact of the outer end of a cylinder with an object the cylinder breaks at the recess, a ball positioned to coact with the valve seat and having a stem extended to engage the filter element for retaining the ball in spaced relation to the valve seat, a hose connection on the outer end of the cylindrical body and a coupling for attaching the opposite end, in which the valve seat and ball are positioned to a nipple extended from an outlet fitting of a container.

Other features and advantages of the invention will appear from the following description taken in connection with the drawing, wherein:

Figure 1 is a side elevational view of the upper end of a high pressure gas container showing a conventional outlet fitting on the end of the container with a safety assembly extended from one side of the fitting, and showing a longitudinal section through the safety valve assembly and intermediate part of the fitting, the valve of the safety connection being shown in the open position.

Figure 2 is a longitudinal section similar to that shown in Fig. 1 showing the portion of the safety connection in which the valve is positioned and showing the valve in the closed position.

Figure 3 is a cross section through the outer end of the safety connection being taken on line 3—3 of Fig. 1.

Figure 4 is a cross-section taken on the line 4—4 of Fig. 1 showing a recess having flat sides in the outer surface of the fitting.

Figure 5 is a cross section taken line 5—5 of Fig. 1, with the parts shown on an enlarged scale showing a weak point in the connection whereby upon accidental engagement of the connection with a fixed object the cylindrical body of the fitting breaks at the weak point.

Referring now to the drawing wherein like reference characters denote corresponding parts the safety connector for high pressure gas containers of this invention includes an elongated cylindrical body 10 having a bore 11 extended therethrough with a counter-bore providing a valve chamber for an auxiliary valve with a valve seat 12 positioned in an enlarged section 13 at the arcuate inner end of the body and with a filter 14 positioned in an enlarged area 15 in the opposite externally threaded outer end of the body, a coupling 16 for connecting the extended end of the body to a hose or the like, a nut 17 for connecting the cylindrical body to a nipple 18, and a ball 19 positioned in the section 13 of the bore of the body and retained in spaced relation to the valve seat 12 by a valve stem 20.

The cylindrical body assembly, as shown in Fig. 1 is adapted to be threaded into a socket 21 of a fitting 22, or in any suitable part of the fitting, or the threaded section 23 of the nipple 18 may be threaded directly into a flange 24 on the end of a container 25.

The outer surface of the cylindrical body 10 is provided with a collar 26 that is positioned to be engaged by an inwardly extended flange 27 of the nut 17 and with the parts assembled, as illustrated in Fig. 1, the nut 17 is threaded on the nipple 18 causing the arcuate end surface 28 of the cylindrical body 10 to engage the corresponding surface 29 of the nipple 18 providing a ground joint or sealed connection. Clearance 30 is provided between the opposite side of the collar 26 and the end of the nipple thereby insuring sealing contact between the surfaces 28 and 29.

The cylindrical body 10 is provided with an annular recess 31 that extends inwardly to a point 32 providing a relatively weak section whereby upon engagement of the extended end of the cylindrical body with a fixed object the cylindrical body will break at the point in which the recess 31 is positioned.

The cylindrical body is also provided with a section 33 having flat sides 34 to facilitate gripping the cylindrical body with a wrench, or the like.

The filter 14 is preferably formed of porous metal whereby the gases are filtered and thoroughly mixed thereby and the element 14 may be secured in the body with threads 35. The extended end of the stem 20 extended from the ball 19 may also be threaded in the filter element as shown at the point 36.

A spider 37 having a center hub 38 and arms 39 is positioned in a counterbore 40 at the outer end of the cylindrical body and the annular rim of the spider may also be threaded in the cylindrical body as shown.

In the design shown the valve body or plug 22 is provided with a threaded shank 41 that is threaded into the flange 24 on the end of the container and the shank may be provided with a bore 42 with an outlet connection 43 extended therefrom and also with a bypass 44 that is closed with a cap 45. The valve element 46 in the fitting is actuated by a handle 47 at the end of a rod 48.

With the parts assembled as illustrated and described it will be appreciated that upon the container being accidently knocked over the body 10 will break at the recess 31 whereby the valve stem will draw the ball 19 against the seat 12 closing the connection and preventing the escape of the high pressure gas.

By this means the hazard of fire, explosion, and damage caused by release of high pressure inflammable or noninflammable gases resulting from accidental breaking of the fitting at the end of a high pressure gas container is substantially eliminated.

It will be understood that modifications, within the scope of the appended claims, may be made in the design and arrangement of the parts without departing from the spirit of the invention.

What is claimed is:

1. A pressure actuated valve assembly comprising an elongated cylindrical body having a longitudinally disposed bore extended therethrough, said cylindrical body having an arcuate inner end and an externally threaded outer end, said arcuate inner end of the body having a counterbore therein and said counterbore providing a valve chamber with a valve seat at the intersection of the bore and counter-bore, a ball in the valve chamber, a valve stem extended through the bore of said cylindrical body, a filter positioned in the outer end of the bore of the cylindrical body and having an opening therein for receiving an end of said valve stem for retaining said valve stem in position whereby the ball is spaced from the valve seat, a hose coupling threaded on the threaded end of said valve body, the arcuate inner end of the valve body having a collar on the outer surface, a nipple having a threaded outer surface positioned on the inner arcuate end of the valve body, and a nut threaded on said nipple and extended over said collar for clamping the nipple on the arcuate inner end of said cylindrical body, said nipple having a threaded extended end, and said cylindrical body having an annular recess therein for weakening the body at a point intermediate of the length thereof and spaced outwardly from said valve seat and said recess being positioned whereby upon breaking of the cylindrical body at the recess as the result of the outer end of the body engaging a fixed object the valve stem releases the ball and the ball is seated upon the valve seat by fluid under pressure in the valve chamber in the counter-bore of the cylindrical body.

2. A pressure actuated valve assembly comprising an elongated cylindrical body having a longitudinally disposed bore extended therethrough, said cylindrical body having an arcuate inner end and an externally threaded outer end, said arcuate inner end of the body having a counter-bore therein and said counter-bore providing a valve chamber with a valve seat at the intersection of the bore and counter-bore, a ball in the valve chamber, a valve stem extended through the bore of said cylindrical body, a filter positioned in the outer end of the bore of the cylindrical body and having an opening therein for receiving an end of said valve stem for retaining said valve stem in position whereby the ball is spaced from the valve seat, a hose coupling threaded on the threaded end of said valve body, the arcuate inner end of the valve body having a collar on the outer surface, a nipple having a threaded outer surface positioned on the inner arcuate end of the valve body, a nut threaded on said nipple and extended over said collar for clamping the nipple on the arcuate inner end of said cylindrical body, said nipple having a threaded extended end, and said cylindrical body having an annular recess therein for weakening the body at a point intermediate of the length thereof and spaced outwardly from said valve seat and said recess being positioned whereby upon breaking of the cylindrical body at the recess as the result of the outer end of the body engaging a fixed object the valve stem releases the ball and the ball is seated upon the valve seat by fluid under pressure in the valve chamber in the counter-bore of the cylindrical body, a fitting providing a plug having a threaded shank extended from one end with a bore through said shank and extended into the plug, said plug having a threaded socket in one side into which the threaded extended end of said nipple is positioned, the nipple having a bore positioned in registering relation with the counter-bore of the cylindrical body and providing communicating means between said counter-bore and bore of the shank of the plug, and a manually actuated valve in said plug and positioned to, selectively, open or close said communicating means between the bore of the nipple and bore of the shank of the plug.

References Cited in the file of this patent

UNITED STATES PATENTS

| | | |
|---|---|---|
| 310,490 | Atwood | Jan. 6, 1885 |
| 368,197 | Drummond | Aug. 16, 1887 |
| 733,372 | Colwell | July 14, 1903 |
| 982,434 | Koss | Jan. 24, 1911 |
| 1,411,483 | Floyd | Apr. 4, 1922 |
| 1,862,111 | Conran | June 7, 1932 |
| 1,874,356 | Rowley | Aug. 30, 1932 |
| 2,607,226 | Biscoe | Aug. 19, 1952 |
| 2,719,532 | Grant | Oct. 4, 1955 |
| 2,770,252 | Boss | Nov. 13, 1956 |